United States Patent [19]
Matsumoto et al.

[11] Patent Number: 6,007,040
[45] Date of Patent: Dec. 28, 1999

[54] SEAT SLIDE APPARATUS

[75] Inventors: Tadashi Matsumoto; Yoshihiro Kanda, both of Kosai, Japan

[73] Assignee: Fujikiko Kabushiki Kaisha, Tokyo, Japan

[21] Appl. No.: 09/175,674

[22] Filed: Oct. 20, 1998

[30]     Foreign Application Priority Data

Oct. 21, 1997  [JP]  Japan .................................. 9-288917

[51] Int. Cl.⁶ .................................................. F16M 13/00
[52] U.S. Cl. ............................................................ 248/429
[58] Field of Search ..................... 248/429, 430

[56]              References Cited

U.S. PATENT DOCUMENTS

| | | | |
|---|---|---|---|
| 4,742,983 | 5/1988 | Nihei ........................................ | 248/429 |
| 4,781,354 | 11/1988 | Nihei et al. ............................. | 248/429 |
| 5,285,993 | 2/1994 | Kamata et al. ......................... | 248/429 |
| 5,829,728 | 11/1998 | Hoshihara et al. ..................... | 248/429 |
| 5,842,383 | 12/1998 | Yamada et al. ......................... | 74/528 |

FOREIGN PATENT DOCUMENTS

| | | |
|---|---|---|
| 68253/90 | 6/1991 | Australia . |
| 349 918 | 1/1990 | European Pat. Off. . |
| 751 029 | 1/1997 | European Pat. Off. . |
| 2 270 765 | 12/1975 | France . |
| 2 390 625 | 12/1978 | France . |
| 2 656 262 | 6/1991 | France . |
| 2 732 279 | 10/1996 | France . |
| 1 449796 | 9/1976 | United Kingdom . |
| 1 573896 | 8/1980 | United Kingdom . |
| 2 221245 | 1/1990 | United Kingdom . |

*Primary Examiner*—Derek J. Berger
*Assistant Examiner*—David Heisey
*Attorney, Agent, or Firm*—Jones & Askew

[57]              ABSTRACT

A seat slide apparatus includes: a lock plate axially attached to a side surface of an upper rail of which a portion near a base portion is axially attached in a freely rotatable manner; a lock hole formed in a lower portion close to a free end of the lock plate; and a lock spring engaging the lock hole with a lock tooth of a lower rail by using an urging force. In the construction, the engagement of the lock hole with a lock tooth prevents a seat main body mounted to the upper rail from moving in a longitudinal direction and canceling the engagement makes the seat main body freely move in the longitudinal direction. A lock plate guiding long hole is formed in the upper rail. A lock spring locking means is provided on the lock plate at a portion corresponding to the lock plate guiding long hole in such a manner that the lock spring locking means is inserted into the lock plate guiding long hole and projects from the lock plate guiding long hole so as to lock the lock spring. Furthermore, a lock plate holding means is provided at a position corresponding to the free end portion of the lock plate in such a manner as to slidably hold the free end side of the lock plate.

4 Claims, 10 Drawing Sheets

SEAT SLIDE APPARATUS

BACKGROUND OF THE INVENTION

1. Field of the Invention

The present invention relates to a seat slide apparatus for a vehicle seat in which a seat main body can be moved in a longitudinal direction.

2. Description of the Related Art

In this kind of seat slide apparatus, a lock plate has a portion near a base portion axially attached to a side surface of an upper rail in a freely rotatable manner. Since the lock plate has a significantly great length to a free end in which a lock tooth is formed, the free end side of the lock plate tends to move apart from the side surface of the upper rail when a load acts on the upper rail. Accordingly, the upper rail moves in a direction of releasing from a lock groove of the lower rail, so that there has been a risk that a lock function of the seat slide apparatus decreases.

The prior art has attempted to prevent the free end side of the lock plate from swinging in a direction of moving apart from the side surface of the upper rail. As shown in FIG. 1, a rivet 3 with a flange 3b having a locking portion 3a for locking a lock spring 2 is loosely fitted to a long hole 1a formed on a side surface of the upper rail 1. Lock plate 4 is mounted to the rivet 3 by caulking, and the upper rail 1 is held between the lock plate 4 and the flange 3b of the rivet 3. The above construction is required other than the rotatably mounted pivot portion of the lock plate 4.

However, in the seat slide apparatus mentioned above, the rivet 3 has a complex configuration integrally formed with flange 3b. This not only increases cost, but also increases the number of assembling processes for the lock plate 4.

SUMMARY OF THE INVENTION

The present invention has been achieved to solve the problems mentioned above. It therefore is an object of the invention to provide a seat slide apparatus to reduce a number of parts and to provide a seat slide apparatus intending an improvement of an assembling characteristic.

In order to achieve the object, according to a first aspect of the present invention, there is provided a seat slide apparatus, comprising: a lock plate axially attached to a side surface of an upper rail, a portion near a base portion of the lock plate being axially attached in a freely rotatable manner; a lock hole formed in a lower portion close to a free end of the lock plate; and a lock spring engaging the lock hole with a lock tooth of a lower rail by using an urging force, wherein the engagement of the lock hole with a lock tooth prevents a seat main body mounted to the upper rail from moving in a longitudinal direction and canceling the engagement makes the seat main body freely move in the longitudinal direction; a lock plate guiding long hole is formed in the upper rail; a lock springy locking means is provided on the lock plate at a portion corresponding to the lock plate guiding long hole in such a manner that the lock spring locking means is inserted into the lock plate guiding long hole and projects from the lock plate guiding long hole so as to lock the lock spring; and a lock plate holding means is provided at a position corresponding to the free end portion of the lock plate in such a manner as to slidably hold the free end side of the lock plate.

Then, in accordance with the seat slide apparatus of the first aspect mentioned above, as well as the lock spring locking means for locking the lock spring is formed in the lock plate, the lock plate holding means for holding the side of the free end of the lock plate is formed in the upper rail. Accordingly, since it is not necessary to separately assemble parts, it is impossible to improve assembling characteristic as well as reducing a number of the parts.

According to a second aspect of the present invention, as it depends from the first aspect, the lock spring locking means is formed by bending the lock plate.

According to a third aspect of the present invention, as it depends from the first aspect, the lock plate holding means is formed by cutting up and bending the upper rail.

Further, in accordance with the seat slide apparatus of the second and third aspects, since the lock spring locking means and the lock plate holding means can be formed by giving a little process to the lock plate and the upper rail, reduced costs are achieved.

According to a fourth aspect of the present invention, as it depends from the first or the third aspect, a notch portion through which the lock plate holding mean can pass is formed at a free end of the lock plate.

Still further, in accordance with the seat slide apparatus of the fourth aspect, since the lock plate can be easily assembled to the upper rail by means of the notch portion formed in the lock plate, improved assembling characteristics, are achieved.

According to a fifth aspect of the present invention, as it depends from the first, the third or the fourth aspect, a guide projection is formed in an upper portion of a free end of the lock plate to be guided by the lock plate holding means.

Furthermore, in accordance with the seat slide apparatus of the fifth aspect, since the free end of the lock plate can be prevented from coming out from the lock plate holding means by means of the guide projection formed in the lock plate, the lock plate can be prevented from moving apart from the upper rail so as to sufficiently perform a function of the lock plate.

BRIEF DESCRIPTION OF THE ACCOMPANYING DRAWINGS

The above and further objects and novel features of the present invention will more fully appear from the following detailed description when the same is read in conjunction with the accompanying drawings; in which.

DETAILED DESCRIPTION OF THE PREFERRED EMBODIMENTS

Figure 1:
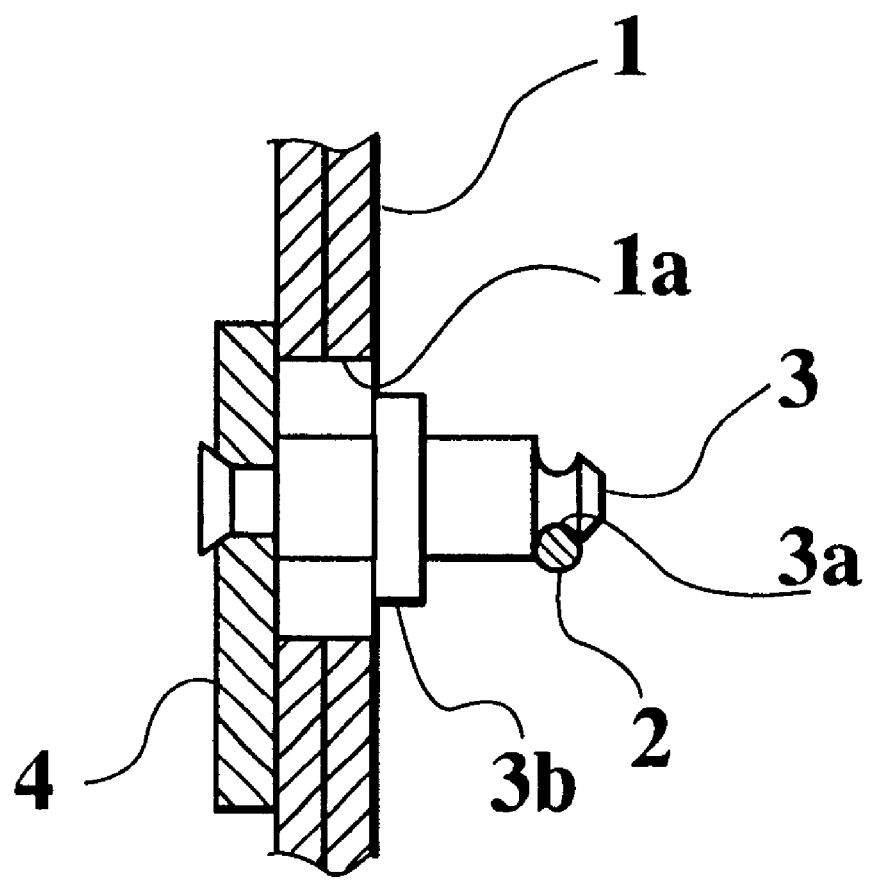
FIG. 1 is a schematic cross sectional view which shows a rain portion of a seat slide apparatus in accordance with a conventional art.

There will be detailed below the preferred embodiments of the present invention with reference to the accompanying drawings. Like members are designated by like reference characters.

FIGS. 2 to 11 show an embodiment in accordance with the present invention which will be described below.

In the drawings, reference numeral 5 denotes a seat slide apparatus for a vehicle seat, which is structured such that a portion near a base portion of a lock plate 40 is axially attached to a side surface of an upper rail 30 in a freely rotatable manner and a lock hole 42 formed below a side of a free end is engaged with a lock tooth 22 in a side of a lower rail 20 by using an urging force of a spring 50, whereby a seat main body 10 can be moved by restricting a motion of the seat main body 10 in a longitudinal direction and canceling the engagement. Further, a long hole 31 for guiding a lock plate is inserted to a position corresponding to the lock plate guiding long hole 31 formed in the upper rail 30, lock spring locking means 43 formed so as to lock a lock spring 50 is provided, and lock plate holding means 60 formed so as to hold a side of a free end of the lock plate 40 in a slidable manner is provided at a position corresponding to the free end portion of the lock plate 40.

Further, the lock spring locking means 43 is formed by bending the lock plate 40, and the lock plate holding means 60 is formed by cutting up and bending the upper rail 30.

Still further, a notch portion 44 through which the lock plate holding means 60 can pass is formed at the free end of the lock plate 40.

Furthermore, a guide projection 45 of the lock plate 40 is formed in an upper portion of the free end of the lock plate.

Further, a structure of the embodiment in accordance with the present invention will be described in detail.

Figure 11:
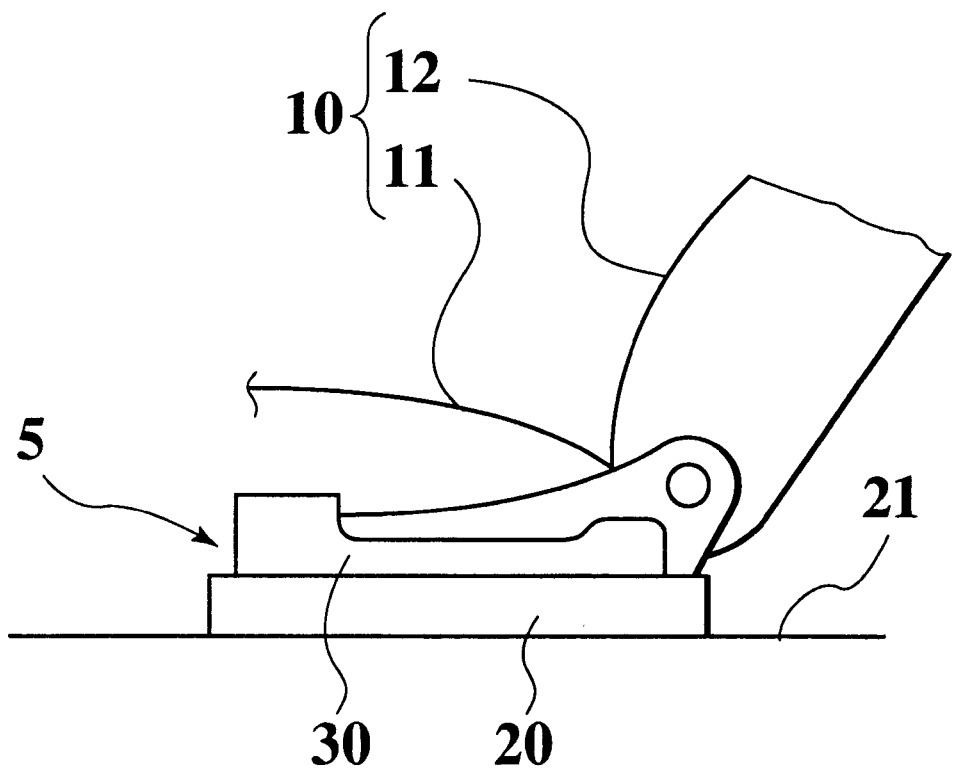
FIG. 11 is a schematic front elevational view which shows a summary of a seat main body.
Figure 12:
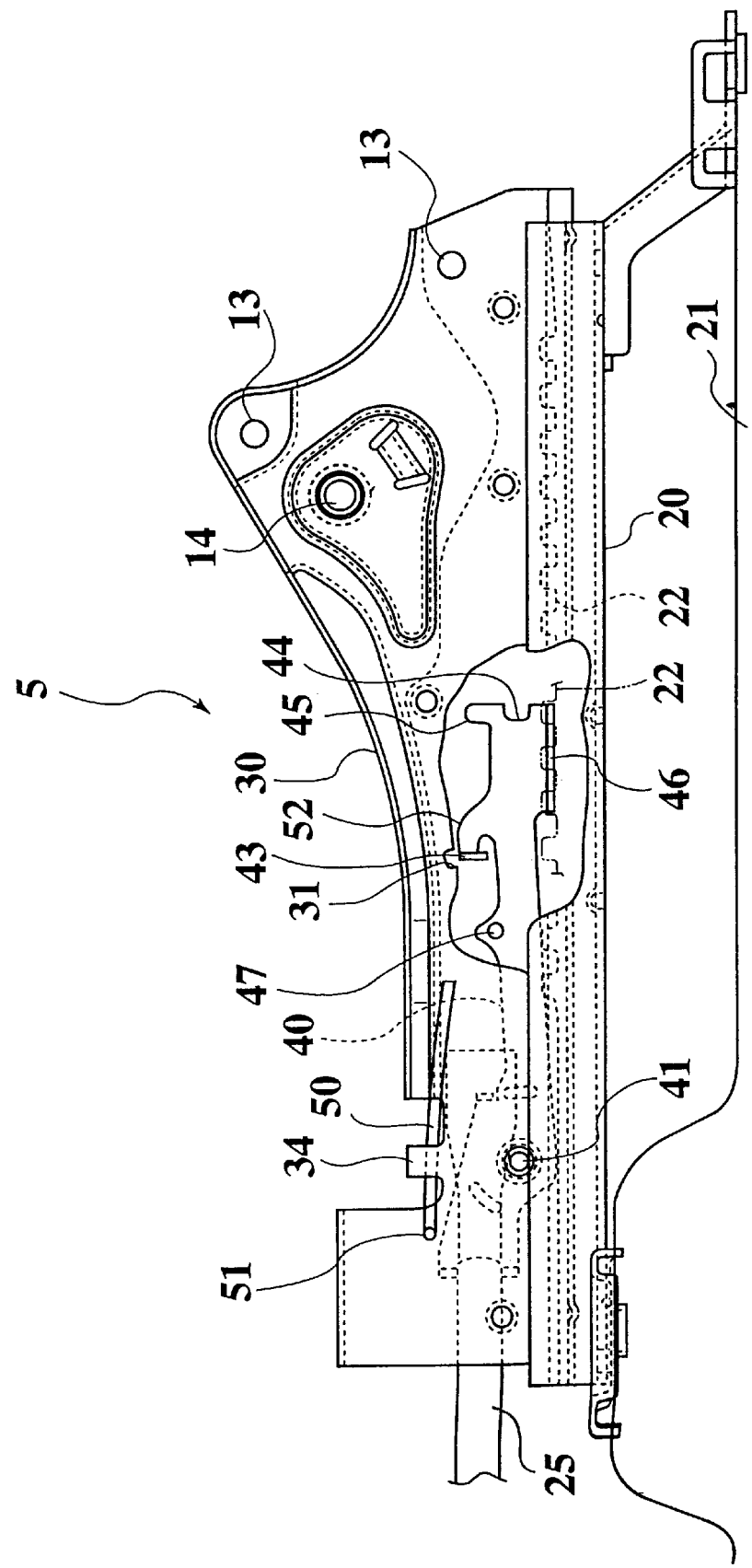
FIG. 12 is a schematic front elevation view partially broken away to show the notch projection and the guide projection.

The seat main body 10 is provided with a seat cushion 11 and a seat back 12 as shown in FIG. 11, and the seat back 12 is axially attached to a rear portion of the seat cushion 11 by a seat reclining apparatus (not shown) at a lower portion thereof in a freely rotatable manner. The lower rail 20 is mounted in a side of a floor 21 of the vehicle body along a longitudinal direction, the lower rail 20 is formed substantially in a U shape in cross section, and locking portions 23 and 23 are inwardly formed on both sides thereof. Further, the upper rail 30 is supported to the lower rail 20 so as to be movable along a longitudinal direction. The upper rail 30 is formed substantially in a reversed-T shape in cross section by overlapping plates formed substantially in an L shapes, and locking portions 15 and 15 are upwardly formed on both sides thereof. Further, the upper rail 30 mounts the seat cushion 11 of the seat main body 10 thereon, whereby the seat main body 10 can move in a longitudinal direction. In this case, mounting holes 13 and 13 for mounting the seat reclining apparatus and a mounting hole 14 for fixing an anchor of a seat belt are formed in a rear portion of the upper rail 30.

A plurality of lock teeth 22 is formed in one of the locking portions 23 of the lower rail 20 at an equal interval along a longitudinal direction. Further, a near portion of the base portion of the lock plate 40 is axially attached to a side of a front portion of a vertical wall portion 16 in the upper rail 30 by a pivotal axis 41 in a freely rotatable manner, and a lock portion 46 having a plurality of, for example, two lock holes 42 capable of locking with the lock tooth 22 of the lower rail 20 is formed in the side of the free end of the lock plate 40. The lock portion 46 of the lock plate 40 projects to an opposite side from the notch 17 formed in a center and lower side of the upper rail 30 so as to be locked with the lock tooth 22.

Figure 4:
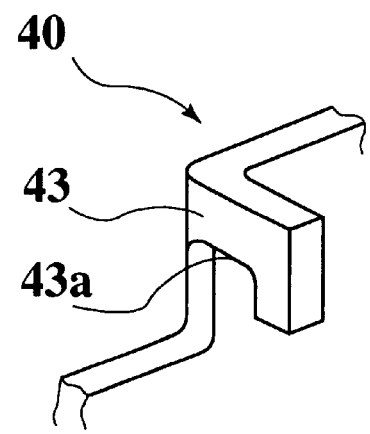
FIG. 4 is a schematic perspective view of lock spring locking means in FIG. 2.
Figure 7:
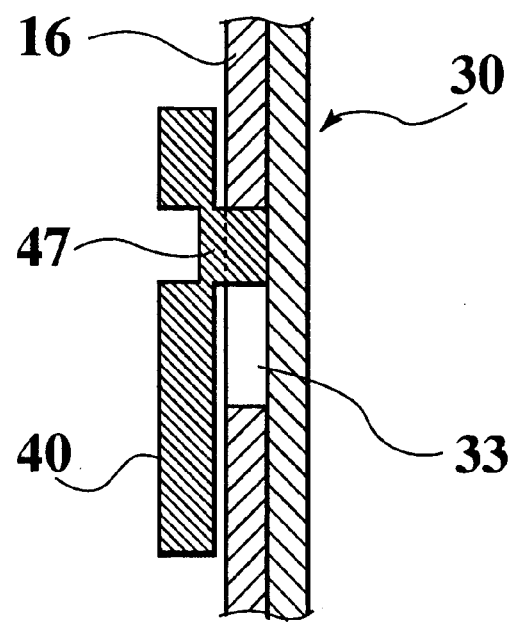
FIG. 7 is a cross sectional view as seen along a line VII—VII in FIG. 9.

A lock spring locking portion 43 as lock spring locking means inserted through the lock plate guiding long hole 31 formed in a circular arc shape around the pivotal axis 41 in the upper rail 30 is formed in the side of the free end of the lock plate 40 by bending as shown in FIG. 4. Further, an embossed protrusion 47 is formed in the lock plate 40, the protrusion 47 is engaged with a groove 33 formed in one of the two vertical wall portions 16 of the upper rail 30 as shown in FIG. 7, and restricts a working range of the lock plate 40 by the groove 33. Further, an operating lever 25 is fixed to the near portion of the base portion of the lock plate 40, and the lock lever 40 can be integrally rotated by rotating the operating lever 25 in a clockwise direction in FIG. 2.

Figure 2:
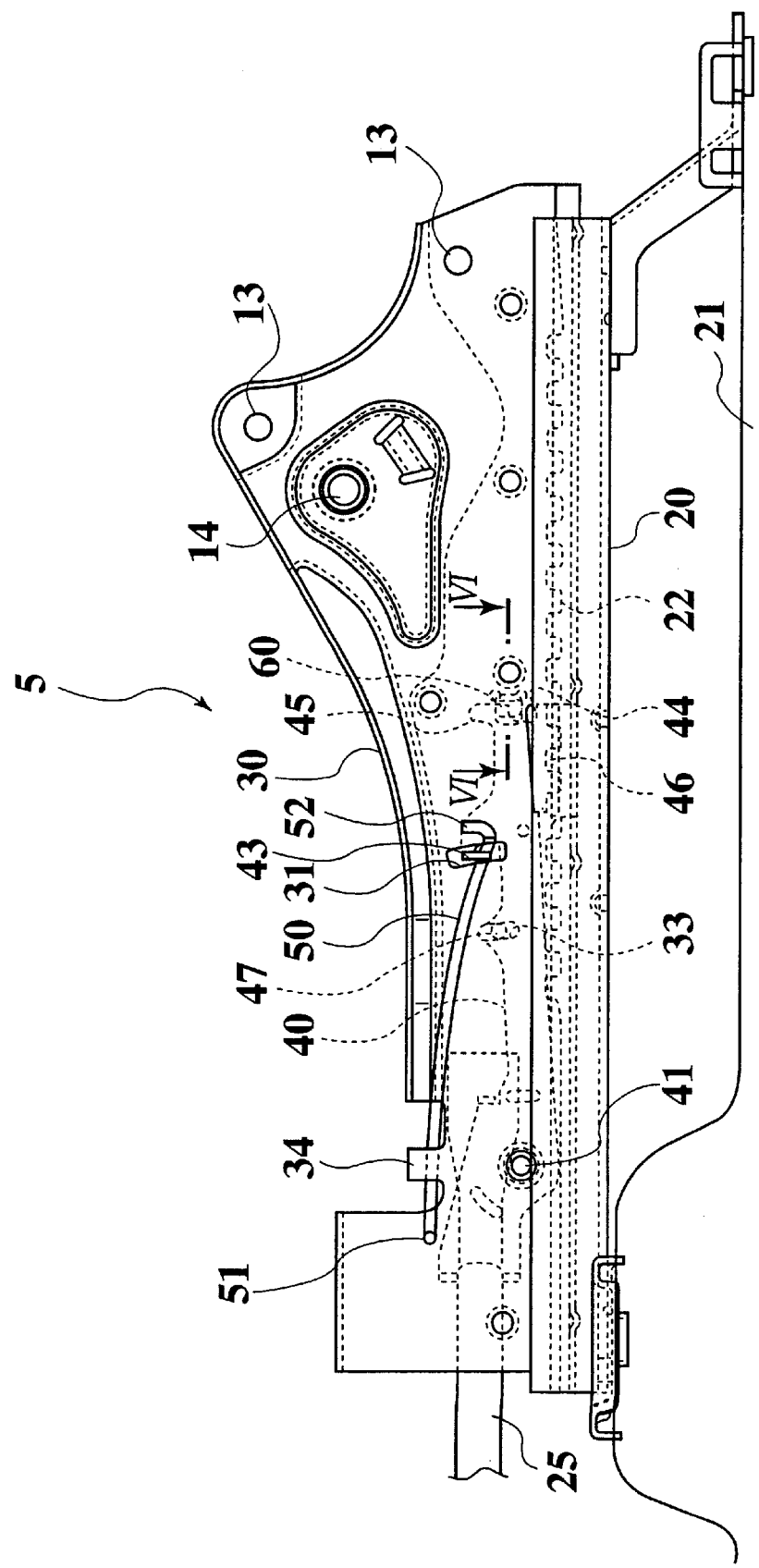
FIG. 2 is a schematic front elevational view which shows a seat slide apparatus in accordance with an embodiment of the present invention at a locking time.
Figure 3:
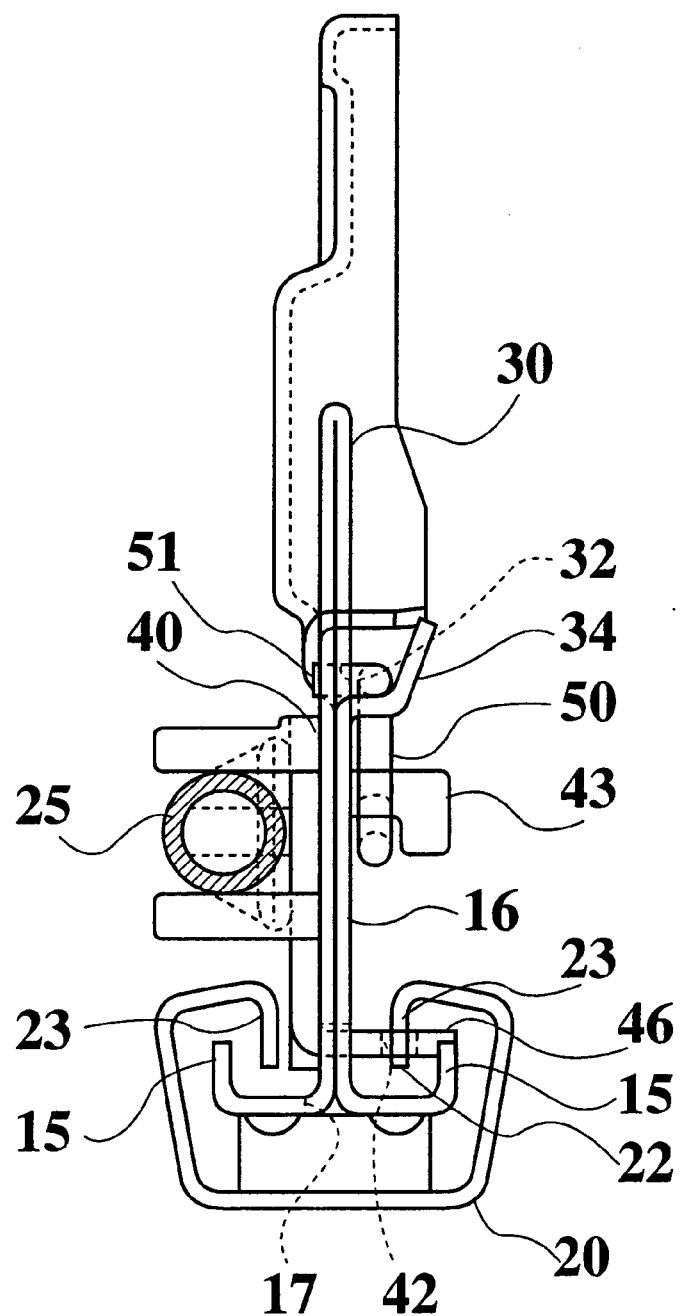
FIG. 3 is a schematic left side elevational view of FIG. 2.

The lock spring 50 is formed in a rod shape, an end 51 thereof is inserted to and locked with a locking hole 32 formed in the upper rail 30, and a hook portion 52 formed in the other end is locked with the lock spring locking portion 43 formed in the lock plate 40 in a state of locking the near portion thereof with the hook portion 34 formed in the upper rail 30 so as to make the lock spring not to rotate, so that the lock plate 40 is urged so as to rotate in a counterclockwise direction in FIG. 2 around the pivotal axis 41 by the lock spring 50. That is, the lock hole 42 of the lock plate 40 is always pressure contacted and engaged with the lock tooth 22 of the lower rail 20, whereby the longitudinal movement of the upper rail 30, that is, the seat main body 10 is restricted.

Figure 5:
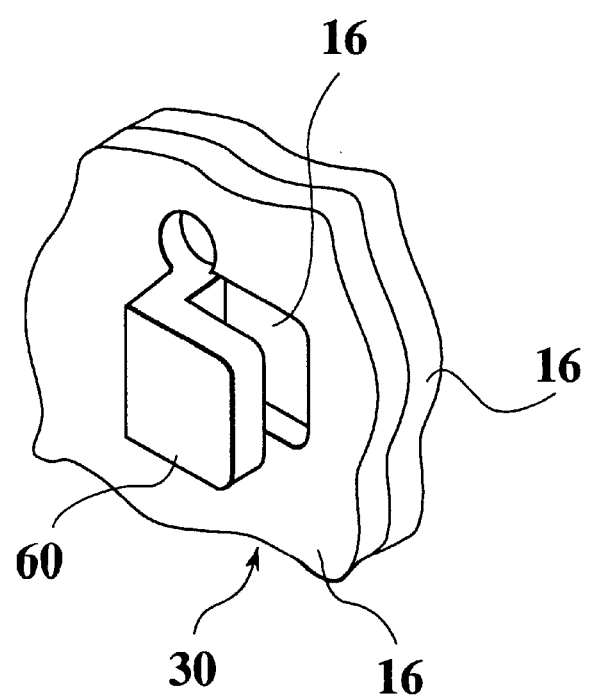
FIG. 5 is a schematic perspective view of lock plate holding means in FIG. 2.
Figure 6:
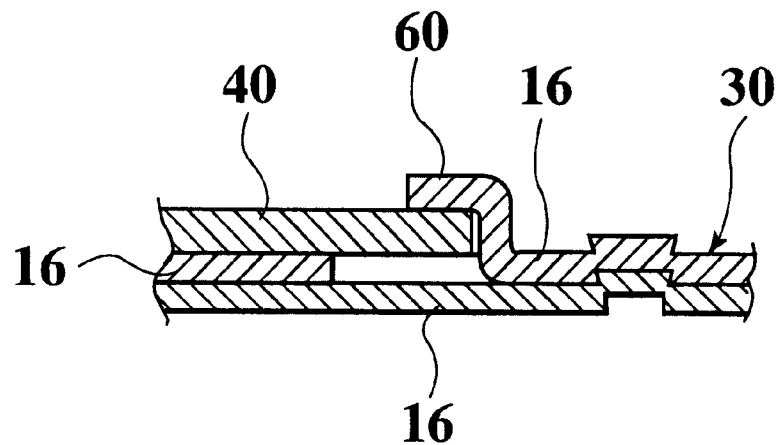
FIG. 6 is a cross sectional view as seen along a line VI—VI in FIG. 2.

A bend portion 60 for holding the lock plate as lock plate holding means is formed at a position corresponding to the free end portion of the lock plate 40 in the upper rail 30 by cutting up one of the vertical wall portions 16 of the upper rail 30 and bending a distal end as shown in FIGS. 5 and 6, and the free end of the lock plate 40 is held within the lock plate holding bend portion 60 in a freely slidable manner.

The notch portion 44 through which the lock plate holding bend portion 60 can pass is formed at a position corresponding to the lock plate holding bend portion 60 in the free end of the lock plate 40. Accordingly, it becomes possible to mount the lock plate 40 to the upper rail 30 from the side portion by aligning the notch portion 44 with the plate holding bend portion 60.

Further, the upper portion of the free end of the lock plate 40, is engaged with the lock plate holding bend portion 60 in a state that the lock hold 42 of the lock plate is pressed and engaged with the lock tooth 22 of the lower rail 20, and the guide protrusion 45 projecting to the upper portion thereof is formed, so that by means of the guide protrusion 45, it is set such that the free end of the lock plate 40 does not come out from the lock plate holding bend portion 60 even when the lock plate 40 rotates downward to a position at which the lock hole 42 of the lock plate 40 is released from the lock tooth 22 of the, lower rail 20.

Next, an operation of the embodiment in accordance with the present invention will be described below.

Figure 9:
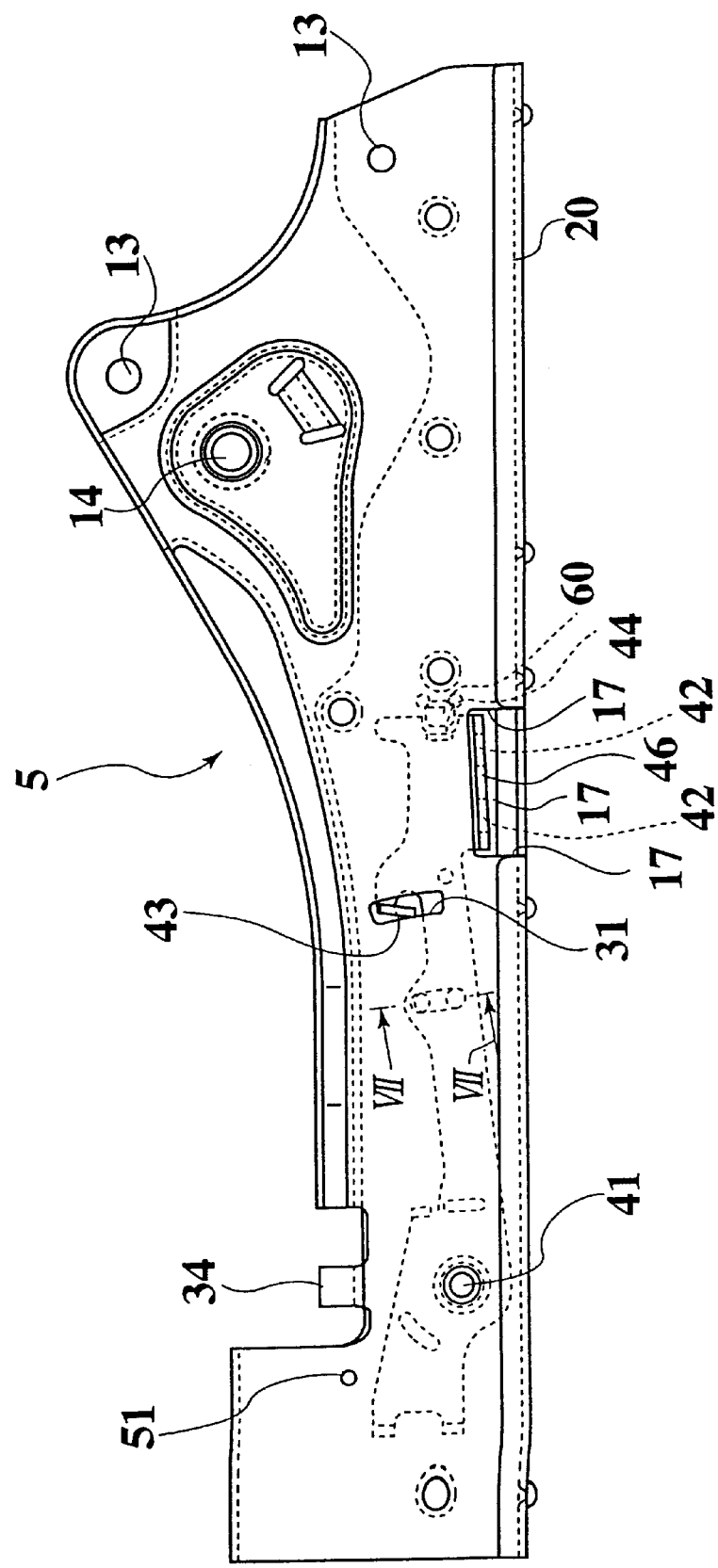
FIG. 9 is a schematic front elevational view which shows a time of mounting the lock plate to the upper rail.
Figure 10:
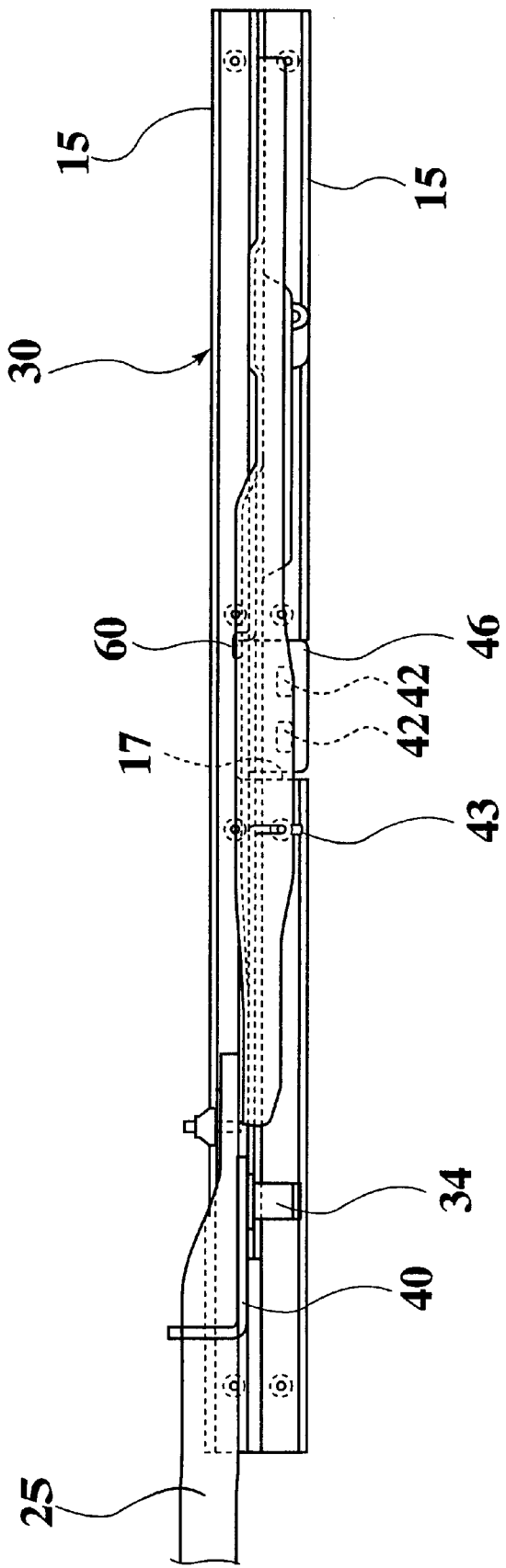
FIG. 10 is a schematic plan view which shows a state of mounting an operating lever to a plan view of FIG. 9.

At a time of mounting the lock plate 40 to the upper rail 30, as shown in FIG. 9, at first the notch portion 44 of the lock plate 40 is inserted to the lock plate holding bend portion 60, and the lock spring locking portion 43 is inserted into the lock plate guiding long hole 31. At this time, the lock portion 46 of the lock plate 40 projects to an opposite side from the notch 17 of the upper rail 30. Next, the side of the base portion of the lock plate 40 is axially supported to the upper rail 30 by the pivotal axis 41. Accordingly, the lock plate 40 can be axially attached to the upper rail 30 in a freely rotatable manner.

Next, by mounting the upper rail 30 to the lower rail 20 through a roller, a ball or the like in a freely slidable manner, the notch portion 44 becomes not to rotate until a position aligning with the lock plate guiding bend portion 60 even when the lock hole 42 of the lock plate 40 rotates to a position of engaging with the lock tooth 22 of the lower rail 20.

Then, the hook portion 52 of the other end is locked with the lock spring locking portion 43 of the lock plate 40 projecting from the lock plate guiding long hole 31 of the upper rail 30 by inserting the one end 51 through the, lock hole 32 of the upper rail 30 and bending the lock spring 50 the near portion of which is locked with the hook portion 34, thereby urging the lock portion 46 of the lock plate 40 in a counterclockwise direction in the drawing, that is, a direction of pressure contacting and engaging the lock hole 42 of the lock plate 40 with the lock tooth 22 of the lower rail 20.

Figure 8:
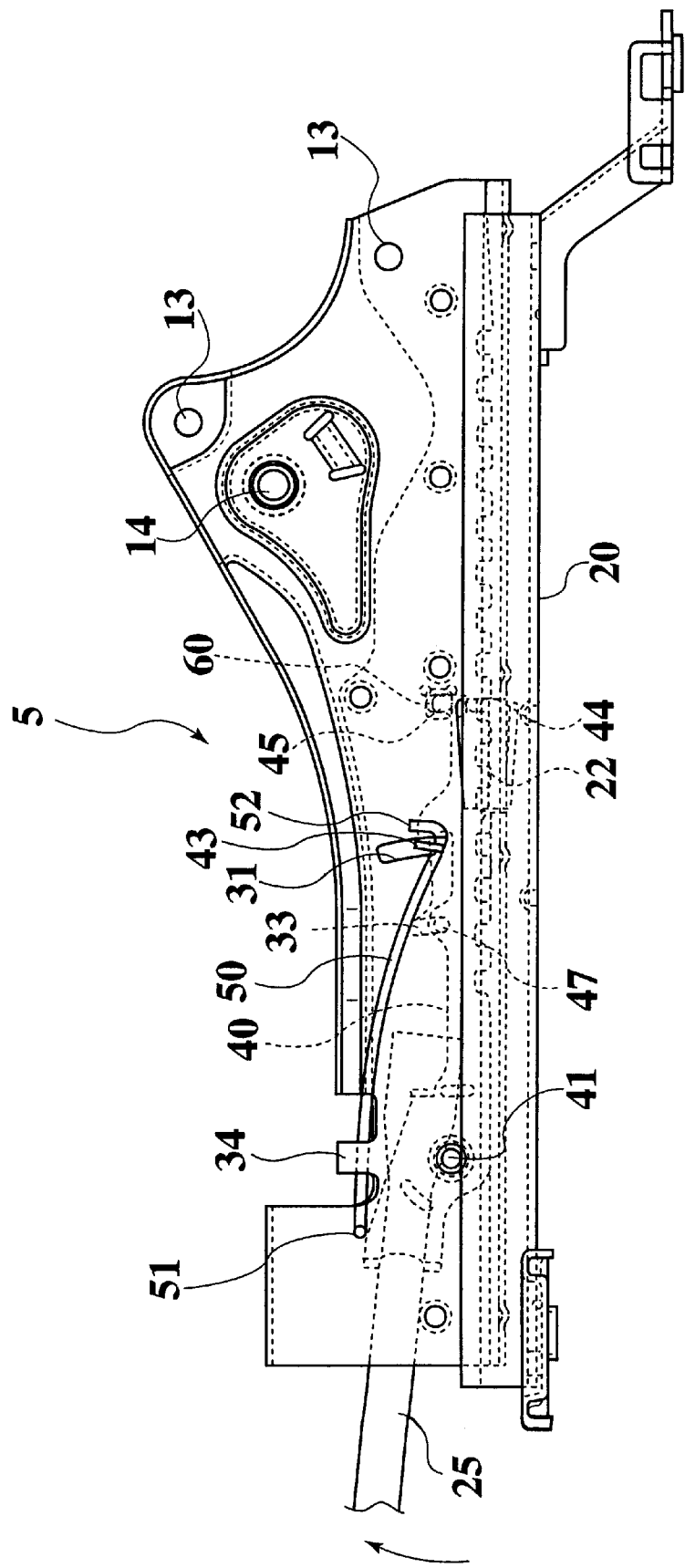
FIG. 8 is a schematic front elevational view which shows a lock canceling time.

Further, the lock plate 40 rotates in a clockwise direction around the pivotal axis 41 as shown in FIG. 8, by rotating the operating lever 25 upward, and can move the seat main body 10 in a longitudinal direction when the lock hole 42 thereof is released from the lock tooth 22 of the lower rail 20.

At a time of downward rotation of the lock plate 40 mentioned above, since the free end of the lock plate 40 is held by the guide protrusion 45 without coming out from the lock plate holding bend portion 60, the lock plate 40 can be prevented from moving apart from the upper rail 30.

As mentioned above, in accordance with the embodiment of the present invention, the lock spring locking portion 43 as the lock spring locking means for locking the lock spring 50 is formed in the lock plate 40, and the lock plate holding bend portion 60 as the lock plate holding means for holding the side of the free end of the lock plate 40 is formed in the upper rail 30. Accordingly, since it is unnecessary to separately assemble the parts, a number of the parts can be reduced and an assembling characteristic can be improved.

Further, since the lock spring locking portion 43 and the lock plate holding bend portion 60 can be formed by giving a little process to the lock plate 40 and the upper rail 30, a cost reduction can be intended.

Still further, since the lock plate 40 can be easily assembled to the upper rail 30 by the notch portion 44 formed in the lock plate 40, an improvement of an assembling characteristic can be intended.

Furthermore, since the free end of the lock plate 40 can be prevented from coming out from the lock plate holding bend portion 60 by the guide protrusion 45 formed in the lock plate 40, a function of the lock plate 40 can be sufficiently performed.

While preferred embodiments of the present invention have been described using specific terms, such description is for illustrative purposes, and it is to be understood that changes and variations may be made without departing from the spirit or scope of the following claims.

What is claimed is:

1. A seat slide apparatus, comprising:

a lower rail to be mounted on a floor of a vehicle body, the lower rail being formed with a plurality of lock teeth;

an upper rail slidably mounted to the lower rail in forward and rearward directions the upper rail being mounted with a seat main body;

a lock plate pivotally attached to a side surface of the upper rail in a manner such that a forward portion of the lock plate is pivotally connected to the upper rail by means of a pivotal axis;

a lock hole formed in a lower portion close to a free end of the lock plate, the lock hole being engaged with one of the lock teeth; and a lock spring rotating the lock plate with an urging force so that the lock hole is engaged with one of the lock teeth;

the engagement of the lock hole with the lock tooth prevents the seat main body mounted to the upper rail from moving in a longitudinal direction and canceling the engagement makes the seat main body freely move in the longitudinal direction;

a lock plate guiding long hole formed in the upper rail;

a lock spring locking means provided on the lock plate at a portion corresponding to the lock plate guiding long hole in such a manner that the lock spring locking means is inserted into the lock plate guiding long hole and projects form the lock plate guiding long hole so as to lock the lock spring;

a lock plate holding means provided at a position corresponding to the free end portion of the lock plate in such a manner as to slidably hold the free end side of the lock plate; and the lock plate and the lock spring locking means being in one unitary body; and the lock spring locking means being bent in relation to the lock plate so as to extend into the lock plate guiding long hole.

2. The seat slide apparatus according to claim 1, wherein the lock plate holding means is formed by cutting up and bending the upper rail.

3. The seat slide apparatus according to claim 1, wherein a notch portion through which the lock plate holding mean can pass is formed at a free end of the lock plate.

4. The seat slide apparatus according to claim 1, wherein a guide projection is formed in an upper portion of a free end of the lock plate to be guided by the lock plate holding means.

* * * * *